(12) United States Patent
Skinner (10) Patent No.: US 9,823,373 B2
(45) Date of Patent: Nov. 21, 2017

(54) ACOUSTIC TELEMETRY WITH DISTRIBUTED ACOUSTIC SENSING SYSTEM

(71) Applicant: HALLIBURTON ENERGY SERVICES, INC., Houston, TX (US)

(72) Inventor: Neal G. Skinner, Lewisville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 274 days.

(21) Appl. No.: 13/672,576

(22) Filed: Nov. 8, 2012

(65) Prior Publication Data

US 2014/0126331 A1   May 8, 2014

(51) Int. Cl.
| | |
|---|---|
| *E21B 47/16* | (2006.01) |
| *G01V 1/40* | (2006.01) |
| *E21B 47/12* | (2012.01) |
| *E21B 47/14* | (2006.01) |
| *G01V 11/00* | (2006.01) |
| *G01V 1/52* | (2006.01) |
| *G01V 1/22* | (2006.01) |

(52) U.S. Cl.
CPC .............. *G01V 1/40* (2013.01); *E21B 47/123* (2013.01); *E21B 47/14* (2013.01); *G01V 11/002* (2013.01); *G01V 1/226* (2013.01); *G01V 2001/526* (2013.01)

(58) Field of Classification Search
CPC ........ E21B 47/16; E21B 47/123; E21B 47/14; E21B 47/101; G01V 1/40; G01V 11/002; G01V 1/226; G01V 2001/526
USPC .......................................................... 367/82
See application file for complete search history.

(56) References Cited

U.S. PATENT DOCUMENTS

| | | | |
|---|---|---|---|
| 2,210,417 | A | 8/1940 | Kinley |
| 2,242,161 | A | 5/1941 | Athy et al. |

(Continued)

FOREIGN PATENT DOCUMENTS

| | | |
|---|---|---|
| CA | 2320394 A1 | 4/2001 |
| CA | 2626596 C | 4/2009 |

(Continued)

OTHER PUBLICATIONS

Kading, Horace, and Hutchins, John S., "Temperature Surveys; The Art of Interpretation," American Petroleum Institute Division of Production, Mar. 12-14, 1969, 20 pages, Paper No. 906-14-N, Lubbock, Texas.

(Continued)

*Primary Examiner* — Zhen Y Wu
(74) *Attorney, Agent, or Firm* — John W. Wustenberg; Tumey L.L.P.

(57) ABSTRACT

An acoustic telemetry method for use with a subterranean well can include positioning a well tool in the well, the well tool including an acoustic transmitter and a sensor, and an acoustic receiver in the well receiving an acoustic signal transmitted by the transmitter, the acoustic signal including information representative of a measurement by the sensor. A system for use with a subterranean well can include a well tool positioned in the well, the well tool including an acoustic transmitter and a sensor, the acoustic transmitter transmits an acoustic signal including information representative of a measurement by the sensor to an acoustic receiver positioned in the well.

23 Claims, 2 Drawing Sheets

(56) References Cited

U.S. PATENT DOCUMENTS

| | | |
|---|---|---|
| 2,739,475 A | 3/1956 | Nowak |
| 2,803,526 A | 8/1957 | Nowak |
| 3,480,079 A | 11/1969 | Guinn et al. |
| 3,854,323 A | 12/1974 | Hearn et al. |
| 3,864,969 A | 2/1975 | Smith, Jr. |
| 4,046,220 A | 9/1977 | Glenn, Jr. |
| 4,208,906 A | 6/1980 | Roberts et al. |
| 4,295,739 A | 10/1981 | Meltz et al. |
| 4,330,037 A | 5/1982 | Richardson et al. |
| 4,410,041 A | 10/1983 | Davies et al. |
| 4,495,411 A | 1/1985 | Rashleigh |
| 4,520,666 A | 6/1985 | Coblentz et al. |
| 4,575,260 A | 3/1986 | Young |
| 4,641,028 A | 2/1987 | Taylor et al. |
| 4,678,865 A | 7/1987 | Sherwin |
| 4,703,175 A | 10/1987 | Salour et al. |
| 4,714,342 A | 12/1987 | Jackson et al. |
| 4,832,121 A | 5/1989 | Anderson |
| 4,845,616 A | 7/1989 | Phillips |
| 4,927,232 A | 5/1990 | Griffiths |
| 4,976,142 A | 12/1990 | Perales |
| 5,026,141 A | 6/1991 | Griffiths |
| 5,026,999 A | 6/1991 | Leonard |
| 5,163,321 A | 11/1992 | Perales |
| 5,182,779 A | 1/1993 | D'Agostino et al. |
| 5,194,847 A | 3/1993 | Taylor et al. |
| 5,249,251 A | 9/1993 | Egalon et al. |
| 5,271,675 A | 12/1993 | Fagan et al. |
| 5,303,207 A | 4/1994 | Brady et al. |
| 5,315,110 A | 5/1994 | Smith |
| 5,326,969 A | 7/1994 | Fagan et al. |
| 5,380,995 A | 1/1995 | Udd et al. |
| 5,451,772 A | 9/1995 | Narendran |
| 5,488,224 A | 1/1996 | Fagan et al. |
| 5,509,474 A | 4/1996 | Cooke, Jr. |
| 5,557,406 A | 9/1996 | Taylor et al. |
| 5,610,583 A | 3/1997 | Drebika et al. |
| 5,623,336 A | 4/1997 | Raad |
| 5,641,956 A | 6/1997 | Vengsarkar et al. |
| 5,659,142 A | 8/1997 | Lima et al. |
| 5,675,674 A | 10/1997 | Weis |
| 5,696,863 A | 12/1997 | Kleinerman |
| 5,825,804 A | 10/1998 | Sai |
| 5,845,033 A | 12/1998 | Berthold et al. |
| 5,862,273 A | 1/1999 | Pelletier |
| 5,892,860 A | 4/1999 | Maron et al. |
| 6,003,376 A | 12/1999 | Burns et al. |
| 6,004,639 A | 12/1999 | Quigley et al. |
| 6,018,501 A | 1/2000 | Smith et al. |
| 6,026,911 A | 2/2000 | Angle et al. |
| 6,041,860 A | 3/2000 | Tubel |
| 6,072,567 A | 6/2000 | Sapack |
| 6,082,454 A | 7/2000 | Tubel |
| 6,233,374 B1 | 5/2001 | Ogle et al. |
| 6,233,746 B1 | 5/2001 | Skinner |
| 6,241,028 B1 | 6/2001 | Bijleveld et al. |
| 6,253,848 B1 | 7/2001 | Reimers et al. |
| 6,271,766 B1 | 8/2001 | Didden et al. |
| 6,281,489 B1 | 8/2001 | Tubel et al. |
| 6,302,204 B1 | 10/2001 | Reimers et al. |
| 6,354,147 B1 | 3/2002 | Gysling et al. |
| 6,367,332 B1 | 4/2002 | Fisher et al. |
| 6,380,534 B1 | 4/2002 | Farhadiroushan et al. |
| 6,408,943 B1 | 6/2002 | Schultz et al. |
| 6,437,326 B1 | 8/2002 | Yamate et al. |
| 6,443,228 B1 | 9/2002 | Aronstam et al. |
| 6,454,011 B1 | 9/2002 | Schempf et al. |
| 6,531,694 B2 | 3/2003 | Tubel et al. |
| 6,542,683 B1 | 4/2003 | Evans et al. |
| 6,555,807 B2 | 4/2003 | Clayton et al. |
| 6,557,630 B2 | 5/2003 | Harkins et al. |
| 6,585,042 B2 | 7/2003 | Summers |
| 6,588,266 B2 | 7/2003 | Tubel et al. |
| 6,590,647 B2 | 7/2003 | Stephenson |
| 6,618,677 B1 | 9/2003 | Brown |
| 6,675,888 B2 | 1/2004 | Schempf et al. |
| 6,691,584 B2 | 2/2004 | Gysling et al. |
| 6,710,720 B2 | 3/2004 | Carstensen et al. |
| 6,712,141 B1 * | 3/2004 | Bussear ............... E21B 47/01 166/250.01 |
| 6,745,833 B2 | 6/2004 | Aronstam et al. |
| 6,751,556 B2 | 6/2004 | Schroeder et al. |
| 6,788,063 B1 | 9/2004 | Peterson et al. |
| 6,789,424 B2 | 9/2004 | Knudsen et al. |
| 6,789,621 B2 | 9/2004 | Wetzel et al. |
| 6,802,373 B2 | 10/2004 | Dillenbeck et al. |
| 6,828,547 B2 | 12/2004 | Tubel et al. |
| 6,913,079 B2 | 7/2005 | Tubel |
| 6,920,395 B2 | 7/2005 | Brown |
| 6,935,425 B2 | 8/2005 | Aronstam |
| 6,945,095 B2 | 9/2005 | Johansen |
| 6,976,535 B2 | 12/2005 | Aronstam et al. |
| 6,977,367 B2 | 12/2005 | Tubel et al. |
| 6,978,832 B2 | 12/2005 | Gardner et al. |
| 6,981,549 B2 | 1/2006 | Morales et al. |
| 6,992,048 B2 | 1/2006 | Reddy et al. |
| 6,997,256 B2 | 2/2006 | Williams et al. |
| 7,000,696 B2 | 2/2006 | Harkins |
| 7,021,146 B2 | 4/2006 | Nash et al. |
| 7,040,390 B2 | 5/2006 | Tubel et al. |
| 7,055,604 B2 | 6/2006 | Jee et al. |
| 7,066,284 B2 | 6/2006 | Wylie et al. |
| 7,077,200 B1 | 7/2006 | Adnan et al. |
| 7,086,484 B2 | 8/2006 | Smith, Jr. |
| 7,140,435 B2 | 11/2006 | Defretin et al. |
| 7,140,437 B2 | 11/2006 | McMechan et al. |
| 7,168,311 B2 | 1/2007 | Zisk, Jr. et al. |
| 7,255,173 B2 | 8/2007 | Hosie et al. |
| 7,282,697 B2 | 10/2007 | Thomas et al. |
| 7,328,624 B2 | 2/2008 | Gysling et al. |
| 7,345,953 B2 | 3/2008 | Crickmore et al. |
| 7,357,021 B2 | 4/2008 | Blacklaw |
| 7,398,680 B2 | 7/2008 | Glasbergen et al. |
| 7,430,903 B2 | 10/2008 | Ramos |
| 7,448,447 B2 | 11/2008 | Walford |
| 7,504,618 B2 | 3/2009 | Hartog et al. |
| 7,580,797 B2 | 8/2009 | Akram et al. |
| 7,610,960 B2 | 11/2009 | Mendez et al. |
| 7,730,774 B2 | 6/2010 | Glasbergen et al. |
| 7,752,953 B2 | 7/2010 | Sokol et al. |
| 7,753,118 B2 | 7/2010 | Ramakrishnan et al. |
| 7,753,119 B2 | 7/2010 | Chen et al. |
| 7,753,120 B2 | 7/2010 | Keller |
| 7,753,122 B2 | 7/2010 | Curlett |
| 7,754,660 B2 | 7/2010 | Putzig |
| 7,755,235 B2 | 7/2010 | Main |
| 7,755,971 B2 | 7/2010 | Heatley et al. |
| 7,755,972 B2 | 7/2010 | Yogeswaren et al. |
| 7,755,973 B2 | 7/2010 | Tello |
| 7,779,683 B2 | 8/2010 | Glasbergen et al. |
| 7,946,341 B2 | 5/2011 | Hartog et al. |
| 7,997,340 B2 | 8/2011 | Bostick, III et al. |
| 8,020,616 B2 | 9/2011 | Greenaway |
| 8,281,875 B2 | 10/2012 | Lovorn et al. |
| 8,397,836 B2 | 3/2013 | Pool et al. |
| 8,561,696 B2 | 10/2013 | Trummer et al. |
| 9,465,126 B2 * | 10/2016 | Lewis .................. G01V 1/226 |
| 2001/0020675 A1 | 9/2001 | Tubel et al. |
| 2002/0040963 A1 | 4/2002 | Clayton et al. |
| 2002/0064331 A1 | 5/2002 | Davis et al. |
| 2002/0092655 A1 | 7/2002 | Fincher et al. |
| 2002/0108783 A1 | 8/2002 | Elkins et al. |
| 2002/0119271 A1 | 8/2002 | Quigley et al. |
| 2002/0122176 A1 | 9/2002 | Haas et al. |
| 2002/0174728 A1 | 11/2002 | Beresford et al. |
| 2003/0010534 A1 * | 1/2003 | Chen et al. ............. 175/61 |
| 2003/0020631 A1 | 1/2003 | Haase et al. |
| 2003/0094281 A1 | 5/2003 | Tubel |
| 2003/0145654 A1 | 8/2003 | Knudsen et al. |
| 2003/0154802 A1 | 8/2003 | Culshaw et al. |
| 2003/0166470 A1 | 9/2003 | Fripp et al. |
| 2003/0173959 A1 | 9/2003 | Paulson et al. |
| 2003/0192692 A1 | 10/2003 | Tubel |
| 2003/0192695 A1 | 10/2003 | Dillenbeck et al. |

(56) References Cited

U.S. PATENT DOCUMENTS

| | | |
|---|---|---|
| 2003/0205083 A1 | 11/2003 | Tubel et al. |
| 2003/0236626 A1 | 12/2003 | Schroeder et al. |
| 2004/0033017 A1 | 2/2004 | Kringlebotn et al. |
| 2004/0040707 A1 | 3/2004 | Dusterhoft et al. |
| 2004/0069069 A1 | 4/2004 | Gysling et al. |
| 2004/0084180 A1 | 5/2004 | Shah et al. |
| 2004/0109228 A1 | 6/2004 | Aronstam |
| 2004/0113104 A1 | 6/2004 | Maida, Jr. |
| 2004/0124008 A1 | 7/2004 | Fincher et al. |
| 2004/0140092 A1 | 7/2004 | Robison |
| 2005/0024231 A1 | 2/2005 | Fincher et al. |
| 2005/0120796 A1 | 6/2005 | Nash et al. |
| 2005/0149264 A1 | 7/2005 | Tarvin et al. |
| 2005/0224229 A1 | 10/2005 | Blacklaw |
| 2005/0271317 A1 | 12/2005 | Taverner |
| 2006/0010973 A1 | 1/2006 | Brown |
| 2006/0109746 A1 | 5/2006 | Crickmore et al. |
| 2006/0133203 A1 | 6/2006 | James et al. |
| 2006/0165344 A1 | 7/2006 | Mendez et al. |
| 2006/0283266 A1 | 12/2006 | Qing et al. |
| 2007/0120051 A1 | 5/2007 | DiFoggio et al. |
| 2007/0126594 A1 | 6/2007 | Atkinson et al. |
| 2007/0234788 A1 | 10/2007 | Glasbergen |
| 2007/0234789 A1 | 10/2007 | Glasbergen et al. |
| 2007/0272406 A1 | 11/2007 | McCoy et al. |
| 2007/0289740 A1 | 12/2007 | Thigpen et al. |
| 2008/0068586 A1 | 3/2008 | Kishida et al. |
| 2008/0088846 A1 | 4/2008 | Hayward et al. |
| 2008/0105434 A1 | 5/2008 | Orbell et al. |
| 2008/0134775 A1 | 6/2008 | Pipchuk et al. |
| 2008/0181554 A1 | 7/2008 | Taverner et al. |
| 2008/0262737 A1 | 10/2008 | Thigpen et al. |
| 2008/0273852 A1 | 11/2008 | Parker et al. |
| 2009/0114386 A1 | 5/2009 | Hartog et al. |
| 2009/0277629 A1* | 11/2009 | Mendez ............ E21B 41/0085 166/250.01 |
| 2009/0303460 A1 | 12/2009 | Habel et al. |
| 2009/0326826 A1 | 12/2009 | Hull et al. |
| 2010/0038079 A1 | 2/2010 | Greenaway |
| 2010/0084142 A1 | 4/2010 | Calderoni et al. |
| 2010/0107754 A1* | 5/2010 | Hartog ............... E21B 47/101 73/152.47 |
| 2010/0122813 A1 | 5/2010 | Trummer et al. |
| 2010/0139386 A1 | 6/2010 | Taylor |
| 2010/0175467 A1 | 7/2010 | Difoggio et al. |
| 2010/0175873 A1 | 7/2010 | Milkovisch et al. |
| 2010/0175875 A1 | 7/2010 | Becker et al. |
| 2010/0175877 A1 | 7/2010 | Parris et al. |
| 2010/0175880 A1 | 7/2010 | Wang et al. |
| 2010/0175889 A1 | 7/2010 | Gartz et al. |
| 2010/0175895 A1 | 7/2010 | Metcalfe |
| 2010/0177310 A1 | 7/2010 | Difoggio |
| 2010/0177595 A1 | 7/2010 | Khare et al. |
| 2010/0177596 A1 | 7/2010 | Fink et al. |
| 2010/0179076 A1 | 7/2010 | Sullivan et al. |
| 2010/0179077 A1 | 7/2010 | Turakhia et al. |
| 2010/0200744 A1 | 8/2010 | Pearce et al. |
| 2011/0024189 A1 | 2/2011 | Saeed et al. |
| 2011/0030467 A1 | 2/2011 | Bakulin |
| 2011/0088462 A1 | 4/2011 | Samson et al. |
| 2011/0090498 A1 | 4/2011 | Samson et al. |
| 2011/0122727 A1* | 5/2011 | Gleitman ............. E21B 36/02 367/81 |
| 2011/0139506 A1 | 6/2011 | Lovorn |
| 2011/0139509 A1 | 6/2011 | Pool |
| 2011/0188344 A1* | 8/2011 | Hartog ............... E21B 43/26 367/27 |
| 2011/0280103 A1* | 11/2011 | Bostick, III ......... E21B 47/101 367/35 |
| 2012/0013893 A1 | 1/2012 | Maida et al. |
| 2012/0014211 A1 | 1/2012 | Maida, Jr. et al. |
| 2012/0016587 A1 | 1/2012 | Sierra et al. |
| 2012/0046866 A1 | 2/2012 | Meyer et al. |
| 2012/0111560 A1 | 5/2012 | Hill et al. |
| 2012/0143899 A1* | 6/2012 | Arango ............ G06F 17/30017 707/769 |
| 2012/0280103 A1 | 11/2012 | Forster |
| 2013/0112404 A1 | 5/2013 | Lovorn et al. |
| 2013/0233537 A1 | 9/2013 | McEwen-King et al. |
| 2014/0069173 A1* | 3/2014 | Roy ................... E21B 47/102 73/40.5 A |
| 2014/0290936 A1* | 10/2014 | Wills ................. E21B 43/26 166/250.1 |

FOREIGN PATENT DOCUMENTS

| | | |
|---|---|---|
| EA | 002374 B1 | 4/2002 |
| EP | 1464204 A1 | 12/2002 |
| EP | 0910725 B1 | 7/2003 |
| EP | 1355166 A2 | 10/2003 |
| EP | 1355169 A2 | 10/2003 |
| EP | 1357401 A2 | 10/2003 |
| EP | 1468258 A2 | 10/2004 |
| EP | 1464204 B1 | 4/2005 |
| EP | 1563323 B1 | 3/2007 |
| EP | 1907664 A1 | 4/2008 |
| EP | 1917444 A1 | 5/2008 |
| EP | 1969204 A2 | 9/2008 |
| EP | 1466138 B1 | 4/2009 |
| EP | 2150681 A1 | 2/2010 |
| EP | 1468258 B1 | 4/2010 |
| EP | 2171207 A1 | 4/2010 |
| EP | 2179127 A1 | 4/2010 |
| EP | 1552490 B1 | 7/2010 |
| EP | 2231997 A2 | 9/2010 |
| GB | 2229787 A | 10/1990 |
| GB | 2230086 A | 10/1990 |
| GB | 2243210 A | 10/1991 |
| GB | 2362462 A | 11/2001 |
| GB | 2364380 A | 1/2002 |
| GB | 2364381 A | 1/2002 |
| GB | 2364384 A | 1/2002 |
| GB | 2367890 A | 4/2002 |
| GB | 2384108 A | 7/2003 |
| GB | 2384313 A | 7/2003 |
| GB | 2384644 A | 7/2003 |
| GB | 2386625 A | 9/2003 |
| GB | 2386687 A | 9/2003 |
| GB | 2397648 A | 7/2004 |
| GB | 2408327 A | 5/2005 |
| GB | 2408328 A | 5/2005 |
| GB | 2408329 A | 5/2005 |
| GB | 2408531 A | 6/2005 |
| GB | 2436142 A | 9/2007 |
| GB | 2446285 A | 8/2008 |
| GB | 2457278 A | 8/2009 |
| JP | 2007240294 A | 9/2007 |
| RU | 2341652 C1 | 12/2008 |
| SU | 1294985 A1 | 3/1987 |
| WO | 9609461 A1 | 3/1996 |
| WO | 9609561 A1 | 3/1996 |
| WO | 9942696 A1 | 8/1999 |
| WO | 0183941 A1 | 11/2001 |
| WO | 0190528 A1 | 11/2001 |
| WO | 0244518 A1 | 6/2002 |
| WO | 03021301 A2 | 3/2003 |
| WO | 03025334 A8 | 3/2003 |
| WO | 03025336 A1 | 3/2003 |
| WO | 03042096 A1 | 5/2003 |
| WO | 03059009 A1 | 7/2003 |
| WO | 03062750 A1 | 7/2003 |
| WO | 03062772 A2 | 7/2003 |
| WO | 03071091 A9 | 8/2003 |
| WO | 03081186 A2 | 10/2003 |
| WO | 03106940 A1 | 12/2003 |
| WO | 2004001356 A2 | 12/2003 |
| WO | 2004005667 A1 | 1/2004 |
| WO | 2004020774 A2 | 3/2004 |
| WO | 2004020789 A2 | 3/2004 |
| WO | 2004020790 A2 | 3/2004 |
| WO | 2004042425 A1 | 5/2004 |
| WO | 2004074627 A1 | 9/2004 |
| WO | 2004076815 A1 | 9/2004 |

(56) References Cited

FOREIGN PATENT DOCUMENTS

| WO | 2004081509 A1 | 9/2004 |
|---|---|---|
| WO | 2004085788 A3 | 10/2004 |
| WO | 2004085795 A1 | 10/2004 |
| WO | 2004094961 A1 | 11/2004 |
| WO | 2004114487 A1 | 12/2004 |
| WO | 2005001237 A1 | 1/2005 |
| WO | 2005017308 A1 | 2/2005 |
| WO | 2006035943 A1 | 4/2005 |
| WO | 2005064117 A1 | 7/2005 |
| WO | 2005106396 A2 | 11/2005 |
| WO | 2005116388 A1 | 12/2005 |
| WO | 2006029379 A1 | 3/2006 |
| WO | 2006031119 A1 | 3/2006 |
| WO | 2006099362 A1 | 9/2006 |
| WO | 2006118920 A3 | 11/2006 |
| WO | 2006138565 A1 | 12/2006 |
| WO | 2007016000 A1 | 2/2007 |
| WO | 2007030017 A1 | 3/2007 |
| WO | 2007112292 A3 | 4/2007 |
| WO | 2007081711 A3 | 7/2007 |
| WO | 2007124330 A3 | 11/2007 |
| WO | 2007126833 A1 | 11/2007 |
| WO | 2008098380 A1 | 8/2008 |
| WO | 2008119951 A2 | 10/2008 |
| WO | 2008133523 A1 | 11/2008 |
| WO | 2008134266 A1 | 11/2008 |
| WO | 2008151128 A9 | 12/2008 |
| WO | 2008156376 A1 | 12/2008 |
| WO | 2009017418 A1 | 2/2009 |
| WO | 2009018448 A2 | 2/2009 |
| WO | 2009048683 A2 | 4/2009 |
| WO | 2009058706 A2 | 5/2009 |
| WO | 2009077867 A2 | 6/2009 |
| WO | 2009086442 A3 | 7/2009 |
| WO | 2009088816 A8 | 7/2009 |
| WO | 2009123476 A1 | 10/2009 |
| WO | 2010020781 A1 | 2/2010 |
| WO | 2010020795 A1 | 2/2010 |
| WO | 2010020796 A1 | 2/2010 |
| WO | 2010065646 A3 | 6/2010 |
| WO | 2010071656 A1 | 6/2010 |
| WO | 2010078615 A1 | 7/2010 |
| WO | 2010080132 A1 | 7/2010 |
| WO | 2010080255 A2 | 7/2010 |
| WO | 2010080353 A2 | 7/2010 |
| WO | 2010080366 A1 | 7/2010 |
| WO | 2010080380 A1 | 7/2010 |
| WO | 2010080473 A1 | 7/2010 |
| WO | 2010080727 A2 | 7/2010 |
| WO | 2010095947 A1 | 8/2010 |

OTHER PUBLICATIONS

Sakaguchi, Keiichi, and Matsushima, Nobuo, "Temperature Profile Monitoring in Geothermal Wells by Distributed Temperature Sensing Technique," Geothermal Resources Council Transactions, Oct. 1995, 4 pages, vol. 19, Geological Survey of Japan, Higashi, Tsukuba, Ibaraki, Japan.
Henninges, J., Zimmermann, G., Buttner, G., Schrotter, J., Erbas, K., and Huenges, E.,"Fibre-Optic Temperature Measurements in Boreholes," FKPE-Workshop, Oct. 23-24, 2003, 9 pages, Hannover, Germany.
Johnson, David O., and Van Domelen, Mary, "StimWatch Stimulation Monitoring Service," Halliburton 2006 Special Meritorious Award for Engineering Innovation, 2006, 4 pages, Houston, Texas.
Knott, Terry, "Wytch Farm Sees the Light," Offshore Engineer, Dec. 1, 2000, 7 pages, oilonline.com.
Kading, Horace, "Shut-in Temperature Profiles Tell Where the Water Went," The Oil and Gas Journal, May 13, 1968, pp. 77-79.
Schlumberger, Oilfield Glossary, Term "Joule-Thomson," 2006, 1 page.
Halliburton Reservoir Performance Monitoring, 2005, 2 pages.

Nowak, T.J., "The Estimation of Water Injection Profiles from Temperature Surveys," Petroleum Transactions, AIME, 1953, pp. 203-212, vol. 198.
Sakaguchi, Keiichi, and Matsushima, Nobuo, "Temperature Logging by the Distributed Temperature Sensing Technique During Injection Tests," Proceedings World Geothermal Congress, May 28-Jun. 10, 2000, pp. 1657-1661, Kyushu—Tohoku, Japan.
Grobwig, St., Graupner, A. Hurtig, E., Kuhn, K., and Trostel, A., "Distributed Fibre Optical Temperature Sensing Technique—A Variable Tool for Monitoring Tasks," 8th International Symposium on Temperature and Thermal Measurements in Industry and Science, Jun. 19-21, 2001, pp. 9-17.
Hurtig, E., Ache, B., Grobwig, S., and Hanel, K., "Fibre Optic Temperature Measurements: A New Approach to Determine the Dynamic Behaviour of the Heat Exchanging Medium Inside a Borehole Heat Exchanger," Terrastock 2000, 8th International Conference on Thermal Energy Storage, Aug. 28-Sep. 1, 2000, Stuttgart, Germany.
Ikeda, N., Uogata,K., Kawazoe, S., and Haruguchi, K., "Delineation of Fractured Reservoir by Transient Temperature Analysis Using Fiber Optic Sensor," Proceedings World Geothermal Congress, May 28-Jun. 10, 2000, pp. 2617-2621, Kyushu—Tohoku, Japan.
Halliburton, "The Impact of Wellbore Phenomena on Fluid Placement and Zonal Coverage", Gerard Glasbergen, Nov. 1-3, 2005, 9 pages.
Oxy Elk Hills, "Using Fiber Optics to Divert Acid on the Fly in the Monterey Shale", Ray Clanton, May 8-10, 2006, 46 pages.
Pruett Industries, "Fiber Optic Distributed Temperature Sensor 'DTS' ", dated at least as early as 2001, 51 pages.
Specification and drawings for U.S. Appl. No. 13/392,900, filed Feb. 28, 2012, 34 pages.
International Search Report with Written Opinion dated Dec. 13, 2011 for PCT Patent Application No. PCT/US2011/035751, 16 pages.
National Oil Well Vargo, "Continuous Circulation System", online article via NOV.com, 1 page.
MPO; "Non Stop Driller", online article via www.managed-pressure.com, 2 pages.
International Search Report with Written Opinion dated Jul. 4, 2011 for International Patent Application No. PCT/GB2010/001949, 15 pages.
Naotsugu Ikeda, "Fractured Reservoir Management by Fiber Optic Distributed Temperature Measurement," Sep. 27-28, 2000, 6 pages.
John Fagley, H.S. Fogler, C.B. Davenport, and R.S. Millhone, "An Improved Simulation for Interpreting Temperature Logs in Water Injection Wells," SPE 10081, Oct. 1982, 10 pages.
R.N. Home, J.L. Perrick, and J. Barua, "The Use of Microcomputers in Well Test Data Acquisition and Analysis," SPE 15308, Jun. 18-20, 1986, SilverCreek, CO, 9 pages.
M.Y. Soliman, "Technique for Considering Fluid Compressibility and Temperature Changes in Mini-Frac Analysis," SPE 15370, Oct. 5-8, 1986, New Orleans, LA, 11 pages.
W.S. Lee, "Study of the Effects of Fluid Rheology on Minifrac Analysis," SPE 16916, Sep. 27-30, 1987, Dallas, TX, 10 pages.
B. Bjornstad, T. Kvisteroy, and M. Eriksrud, "Fibre Optic Well Monitoring System," SPE 23147, Sep. 3-6, 1991, Aberdeen, 8 pages.
M.P. Cleary, D.E. Johnson, H.H. Kogsboll, K.A. Owens, K.F. Perry, C.J. de Pater, A. Stachel, H. Schmidt, and M. Tambini, "Field Implementation of Proppant Slugs to Avoid Premature Screen-Out of Hydraulic Fractures with Adequate Proppant Concentration," SPE 25892, Apr. 12-14, 1993, Denver, CO, 16 pages.
G. Botto, B. Maggioni and A. Schenato, "Electronic, Fiber-Optic Technology: Future Options for Permanenet Reservoir Monitoring," SPE 28484, Sep. 25-28, 1994, New Orleans, LA, 10 pages.
O.S. Karaman, R.L. Kutlik, and E.L. Kluth, "A Field Trial to Test Fiber Optic Sensors for Downhole Temperature and Pressure Measurements, West Coalinga Field, California," SPE 35685, May 22-24, 1996, Anchorage, AK, 7 pages.
L. Saputelli, H. Mendoza, J. Finol, L. Rojas, E. Lopez, H. Bravo, and S. Buitriago, "Monitoring Steamflood Performance through Fiber Optic Temperature Sensing," SPE 54104, Mar. 17-19, 1999, Bakersfield, CA, 7 pages.

(56) References Cited

OTHER PUBLICATIONS

B.D. Carnahan, R.W. Clanton, K.D. Koehler, G.O. Harkins, and G.R. Williams, "Fiber Optic Temperature Monitoring Technology," SPE 54599, May 26-28, 1999, Anchorage, AK, 10 pages.
Klas Eriksson, "Fiber Optic Sensing—Case of 'Solutions Looking for Problems'," SPE 71829, Aberdeen, Scotland, Sep. 4-7, 2001, 5 pages.
D. Callison, J. Jones, B. Shelley, and R. Lockman, "Integrated Modeling of a Field of Wells—An Evaluation of Western Shallow Oil Zone Completion Practices in the Elk Hills Field, Kern County, California," SPE 76724, Anchorage, AK, May 20-22, 2002, 10 pages.
G. Corbett, E. E Fagervik, S. Christie, B. Smith, and K. Falcon, "Fiber Optic Monitoring in Openhole Gravel Pack Completions," SPE 77682, San Antonio, TX, Sep. 29-Oct. 2, 2002, 14 pages.
G.A. Brown, and A. Hartog, "Optical Fiber Sensors in Upstream Oil & Gas," SPE 79080, 2002, 3 pages.
G. Brown, D. Storer, K. McAllister, M. al-Asimi, and K. Raghavan, "Monitoring Horizontal Producers and Injectors During Cleanup and Production Using Fiber-Optic-Distributed Temperature Measurements," SPE 84379, Oct. 5-8, 2003, Denver, CO, 6 pages.
D.O. Johnson, R. Sugianto, P.H. Mock, and C.H. Jones, "Identification of Steam-Breakthrough Intervals with DTS Technology," SPE 87631, Feb. 2004, 8 pages.
H. Foucault, D. Poilleux, A. Djurisic, M. Slikas, J. Strand, and R. Silva, "A Successful Experience for Fiber Optic and Water Shut Off on Horizontal Wells With Slotted Liner Completion in an Extra Heavy Oil Field," SPE 89405, Apr. 17-21, 2004, Tulsa, OK, 6 pages.
B. Hasebe, A. Hall, B. Smith, J. Brady, and P. Mehdizadeh, "Field Qualification of Four Multiphase Flowmeters on North Slope, Alaska," SPE 90037, Sep. 26-29, 2004, Houston, TX, 13 pages.
A. Bond, C. Blount, T. Kragas, and S. Mathias, "Use of a Fiber Optic Pressure/Temperature Gauge in an Exploration Well to Minimize Formation Damage Potential and Reduce Costs During Production Testing," SPE 90130, Sep. 26-29, 2004, Houston, TX, 10 pages.
L.B. Ouyang, and D. Belanger, "Flow Profiling via Distributed Temperature Sensor (DTS) System—Expectation and Reality," SPE 90541, Sep. 26-29, 2004, Houston, TX, 14 pages.
D. K. Nath, "Fiber Optics Used to Support Reservoir Remperature Surveillance in Duri Steamflood," SPE 93240, Apr. 5-7, 2005, Jakarta, Indonesia, 9 pages.
G. Glasbergen, D. van Batenburg, M. van Domelen, and R. Gdanski, "Field Validation of Acidizing Wormhole Models," SPE 94695, May 25-27, 2005, Scheveningen, The Netherlands, 11 pages.
G. Brown, V. Carvalho, A. Wray, A. Sanchez, and G. Gutierrez, "Slickline With Fiber-Optic Distributed Temperature Monitoring for Water-Injection and Gas Lift Systems Optimization in Mexico," SPE 94989, Jun. 20-23, 2005, Rio de Janeiro, Brazil, 10 pages.
K. Yoshioka, D. Zhu, A.D. Hill, P. Dawkrajai, and L.W. Lake, "A Comprehensive Model of Temperature Behavior in a Horizontal Well," SPE 95656, Oct. 9-12, 2005, Dallas, TX, 15 pages.
G. Gao, and Y. Jalali, "Interpretation of Distributed Temperature Data During Injection Period in Horizontal Wells," SPE 96260, Oct. 9-12, 2005, Dallas, TX, 8 pages.
V. Pimenov, G. Brown, V. Tertychnyi, A. Shandrygin, and Y. Popov, "Injectivity Profiling in Horizontal Wells Through Distributed Temperature Monitoring," SPE 97023, Oct. 9-12, 2005, Dallas, TX, 8 pages.
D.K. Nath, R. Sugianto, and D. Finley, "Fiber-Optic Distributed Temperature Sensing Technology Used for Reservoir Monitoring in an Indonesia Steam Flood," SPE 97912, Nov. 1-3, 2005, Calgary, Alberta, Canada, 10 pages.
R.W. Clanton, J.A. Haney, R. Pruett, C.L. Wahl, J.J. Goiffon, and D. Gualtieri, "Real-Time Monitoring of Acid Stimulation Using a Fiber-Optic DTS System," SPE 100617, May 8-10, 2006, Anchorage, AK, 10 pages.
Office Action dated Oct. 10, 2013 for U.S. Appl. No. 13/693,549, 51 pages.
Office Action dated Jul. 1, 2013 for U.S. Appl. No. 12/838,726, 23 pages.
Office Action dated Jul. 10, 2013 for U.S. Appl. No. 13/693,549, 53 pages.
Russian Office Action dated Jun. 10, 2013 for RU Patent Application No. 2013107010/20, 3 pages.
English Translation of Russian Office Action issued Jun. 10, 2013 for RU Patent Application No. 2013107010/20, 1 page.
Office Action dated Jan. 28, 2011 for U.S. Appl. No. 12/603,299, 44 pages.
Partial Search Report dated Apr. 7, 2011 for International application No. PCT/GB2010/001949, 5 pages.
Office Action dated Jan. 16, 2014 for U.S. Appl. No. 14/033,304, 11 pages.
International Search Report with Written Opinion dated Jan. 20, 2014 for PCT Patent Application No. PCT/US13/064066, 14 pages.
International Search Report with Written Opinion dated Jan. 20, 2014 for PCT Patent Application No. PCT/US13/064071, 15 pages.
Office Action dated Mar. 14, 2014 for Russian Patent Application No. 2013107011, 3 pages.
English translation of Office Action dated Mar. 14, 2014 for Russian Patent Application No. 2013107011, 4 pages.
Examination Report dated May 7, 2014 for Australian Patent Application No. 2011281373, 3 pages.
English Abstract of Russian publication No. RU2341652, retrieved May 20, 2014 from http://worldwide.espacenet.com/publicationDetails/biblio?DB=EPODOC&II=0&ND=3&adjacent=true&locale=en_EP&FT=D&date=20081220&CC=RU&NR=2341652C1&KC=C1, 1 page.
English abstract of Eurasian Patent Organization publication No. EA002374, retrieved May 20, 2014 from http://worldwide.espacenet.com/publicationDetails/biblio?DB=Epodoc&II=0&ND=3&adjacent=true&locale=en_EP&FT=D&date=20020425&CC=EA&NR=002374B1&KC=B1, 1 page.
Wikipedia; "Nyquist Frequency", online encyclopedia, dated Jul. 11, 2010, 3 pages.
Wikipedia; "Nyquist-Shannon Sampling Theorem" online encyclopedia, dated Jul. 17, 2010, 13 pages.
International Search Report with Written Opinion dated Feb. 10, 2011 for PCT Patent Application No. PCT/GB10/001950, 12 pages.
Office Action dated Mar. 29, 2012 for U.S. Appl. No. 12/603,334, 53 pages.
Office Action dated Oct. 30, 2012 for U.S. Appl. No. 12/603,334, 10 pages.
Fotech Solutions; "Oil & Gas: Sound at the Speed of Light", company brochure, dated 2010, 4 pages.
Helios; "Helios Distributed Acoustic Sensor", product information, 2 pages.
Office Action dated Nov. 20, 2007 for U.S. Appl. No. 11/398,483, 20 pages.
Office Communication dated Dec. 10, 2007 for U.S. Appl. No. 11/398,483, 3 pages.
Office Action dated Sep. 26, 2008 for U.S. Appl. No. 11/398,503, 23 pages.
Office Action dated Apr. 14, 2009 for U.S. Appl. No. 11/398,503, 9 pages.
Office Action dated Jan. 12, 2010 for U.S. Appl. No. 12/167,884, 16 pages.
Office Action dated Jan. 13, 2010 for U.S. Appl. No. 12/167,910, 16 pages.
John Fagley, et al, "An Improved Simulation for Interpreting Temperature Logs in Water Injection Wells", dated Oct. 1982, 10 pages.
American Petroleum Institute, "Temperature Surveys; The Art of Interpretation", Horace Kading, John S. Hutchings; dated Mar. 1969, 20 pages.
Geothermal Resources Council Transactions, "Temperature Profile Monitoring in Geothermal Wells by Distributed Temperature Sensing Technique", vol. 19, Oct. 1995, 4 pages.
J. Henninges, et al., "Fibre-optic Temperature Measurements in Boreholes", dated Oct. 2003, 9 pages.
Halliburton, "StimWatch Stimulation Monitoring Service", dated 2006, 4 pages.

(56) References Cited

OTHER PUBLICATIONS

Terry Knott, "Wytch Farm Sees the Light", Oil Online, dated Dec. 1, 2000, 7 pages.
The Oil and Gas Journal, "Shut-in Temperature Profiles Tell Where the Water Went", Horace Kading, dated May 1968, 3 pages.
Schlumberger, Oilfield Glossary, "Joule-Thomson", dated Mar. 2006, 1 page.
Halliburton, "Reservoir Performance Monitoring", dated Nov. 2005, 2 pages.
Petroleum Transactions, "The Estimation of Water Injection Profiles from Temperature Surveys", T.J. Nowak, dated 1953, 10 pages.
World Geothermal Congress, "Temperature Logging by the Distributed Temperature Sensing Technique during Injection Tests", pp. 1657-1661, dated Jun. 2000, 5 pages.
Stephan Großwig, et al., "Distributed Fibre Optical Temperature Sensing Technique—A Variable Tool for Monitoring Tasks," Proceedings of the 8th International Symposium on Temperature and Thermal Measurements in Industry and Science, dated Jun. 2001, 9 pages.
Eckart Hurtig, et al., "Fibre Optic Temperature Measurements", Terrastock 2000, dated Aug.-Sep. 2000, 9 pages.
World Geothermal Congress, "Delineation of Fractured Reservoir by Transient Temperature Analysis Using Fiber Optic Sensor", pp. 2617-2621, dated Jun. 2000, 5 pages.
Halliburton, "The Impact of Wellbore Phenomena on Fluid Placement and Zonal Coverage," Gerard Glasbergen, undated, 9 pages.
Oxy Elk Hills, "Using Fiber Optics to Divert Acid on the Fly in the Monterey Shale", Ray Clanton, undated, 46 pages.
Pruett Industries, "Fiber Optic Distributed Temperature Sensor 'DTS'", undated, 51 pages.
Wikipedia, Convolution, web archive, dated Jun. 23, 2010, 14 pages.
Prof. Tom O'Haver, Deconvolution, web archive, dated Jul. 14, 2008, 3 pages.
Ikeda, Fractured Reservoir Management by Fiber Optic Distribution Temperature Measurement, dated Sep. 27-28, 2000, 6 pages.
International Search Report with Written Opinion dated Dec. 13, 2012 for PCT Patent Application No. PCT/GB2011/001068, 12 pages.
International Search Report with Written Opinion dated Jan. 30, 2013 for PCT Patent Application No. PCT/GB2011/001085, 12 pages.
Office Action dated Aug. 17, 2012 for U.S. Appl. No. 12/835,952, 62 pages.
Brigham, E. Oran; "The Fast Fourier Transform", Prentice-Hall, dated 1974, 7 pages.
Brigham, E. Oran, The Fast Fourier Transform, "Convolution and Correlation" Published Nov. 28, 1973, Prentice-Hall, pp. 50-74.
Office Action dated Apr. 15, 2013 for U.S. Appl. No. 12/838,736, 86 pages.
Examiner's Answer dated Jul. 13, 2010 for U.S. Appl. No. 11/398,503, 15 pages.
International Search Report with Written Opinion dated Aug. 19, 2010, for US Patent Application Serial No. PCT/US10/024100, 14 pages.
Office Action dated Jun. 26, 2012 for U.S. Appl. No. 12/816,749, 46 pages.
Office Action dated Jul. 17, 2014 for U.S. Appl. No. 14/033,304, 44 pages.
Office Action dated Dec. 5, 2006 for U.S. Appl. No. 11/398,503, 8 pages.
Office Action dated Apr. 6, 2010 for U.S. Appl. No. 12/167,910, 15 pages.
Sierra, Jose; Kaura, Jiten; Welldynamics; Gualtieri, Dan; Glasbergen, Gerard; Sarkar, Diptadhas; Halliburton; Johnson, David; Digital Ascension; "DTS Monitoring Data of Hydraulic Fracturing: Experiences and Lessons Learned", SPE 116182, dated 2008, 15 pages.

* cited by examiner

ACOUSTIC TELEMETRY WITH DISTRIBUTED ACOUSTIC SENSING SYSTEM

BACKGROUND

This disclosure relates generally to equipment utilized and operations performed in conjunction with a subterranean well and, in one example described below, more particularly provides for acoustic telemetry using a distributed acoustic sensing (DAS) system.

It can be useful to monitor parameters in a well over time. For example, production efficiency and output can be enhanced by obtaining the most accurate information available for a given well via downhole sensor measurements. However, a means of obtaining the sensor measurements is needed.

For this purpose and others, it would be advantageous to provide advancements in the art of telemetry in wells. For example, such advancements could be used for transmitting sensor measurements from well tools.

DETAILED DESCRIPTION

In one example described more fully below, a downhole well tool contains one or more sensors and an acoustic transmitter capable of generating an acoustic signal that can be detected by an optical fiber or other optical waveguide connected to a distributed acoustic sensing (DAS) instrument, for example, positioned at or near the earth's surface. With the use of a DAS instrument at the surface, normal, unmodified optical fiber (usually single mode fiber) can be used as an acoustic receiver.

Some modifications to standard fiber can be made, if desired. For example, fiber Bragg gratings written in the fiber can allow the fiber to function as a distributed acoustic receiver for detecting acoustic waves which cause vibrations in the fiber. Additionally, standard fiber can be modified by writing or constructing intrinsic or extrinsic Fabry-Perot interferometers in the fiber.

If modified fiber is used, different types of instruments, designed to interrogate the various types of modified fiber may be used at the surface. Instruments used to interrogate multiple sensors distributed along modified fiber are well known in the art.

A DAS system example is described below, but it should be clearly understood that any type of distributed acoustic sensing system could benefit from the principles described herein. For example, in various different types of distributed acoustic sensing systems, backscattering of light in an optical waveguide may be used to detect acoustic signals (in which case the waveguide itself is an acoustic sensor), intrinsic or extrinsic Fabry-Perot interferometers may be used as acoustic sensors, intrinsic or extrinsic fiber Bragg gratings may be used as acoustic sensors, etc. The scope of this disclosure is not limited to use with any particular type of distributed acoustic sensing system.

One or more optical waveguides can be incorporated into a cable installed in a well. The cable can be positioned in cement surrounding a casing, between tubular strings, or in a wall of a tubular string, etc. The scope of this disclosure is not limited to any particular position of the optical waveguide(s) and/or cable.

The well tool records measurements from its sensor(s) and generates acoustic data packets, which cause minute, time varying changes in strain in the optical waveguide, in response to the acoustic waves impinging on the optical waveguide. These changes in strain are detected by the DAS instrument or other fiber optic interrogator at the surface, where the acoustic data signal is demodulated.

The data could be modulated on the acoustic signal using any of a variety of different modulation techniques. For example, frequency shift keying, phase shift keying, differential phase shift keying, dual tone multi-frequency, amplitude modulation, etc. The scope of this disclosure is not limited to use of any particular modulation technique.

Preferably, the well tool is battery powered, or is supplied with electrical power from a downhole source. This is due to the fact that, if electrical lines extend from the surface to the well tool, those lines could be used for transmitting sensor measurements to the surface, without use of acoustic telemetry and the optical waveguide.

To conserve battery life, the well tool could store data over time, and transmit a series of time-stamped sensor measurements at predetermined time intervals. If sufficient battery or downhole generated power is available, the well tool may transmit in real time.

The well tool could be triggered to send data on command, or to change the data source, data rate, modulation technique or transmitting frequency in response to commands from the surface. These commands may be in the form of acoustic pulses transmitted down the well from the surface, or up the well from a source beyond the well tool.

Acoustic pulses could be transmitted using, for example, a HALSONICS™ air gun transmitter marketed by Halliburton Energy Services of Houston, Tex. USA. However, other forms of telemetry could be used in other examples.

Commands could be transmitted by movement, including performing certain series of longitudinal and/or rotational movements of the well tool. If the well tool is connected in a tubular string, the tubular string could be manipulated from the surface to transmit certain commands to the well tool.

Commands could be transmitted by forces and/or torques applied to the well tool. For example, tension applied to a tubular string in which the well tool is connected can be slacked off to decrease tension (or increase compression) in the tubular string, and can be picked up on to increase tension (or decrease compression) in the tubular string.

Commands could be transmitted by applying a series of pressure fluctuations (positive and/or negative) to the well. The pressure fluctuations could be received by a pressure sensor of the well tool.

The well tool could be conveyed in the well by, for example, jointed or continuous tubing, by slickline or wireline, etc. In some examples, the well tool could be permanently installed in the well.

In one example, the well tool could be conveyed by slickline or coiled tubing, and removably installed in a landing nipple or a side pocket mandrel. In this manner, the well tool may be semi-permanently installed for long term reservoir monitoring, but can be conveniently removed, repaired, and/or replaced if, for example, it becomes inoperable due to electronics failure or spent batteries, it is desired to upgrade the well tool, or if monitoring requirements change. Using multiple landing nipples or side pocket mandrels, the location of the well tool can also be varied as desired.

Figure 1:
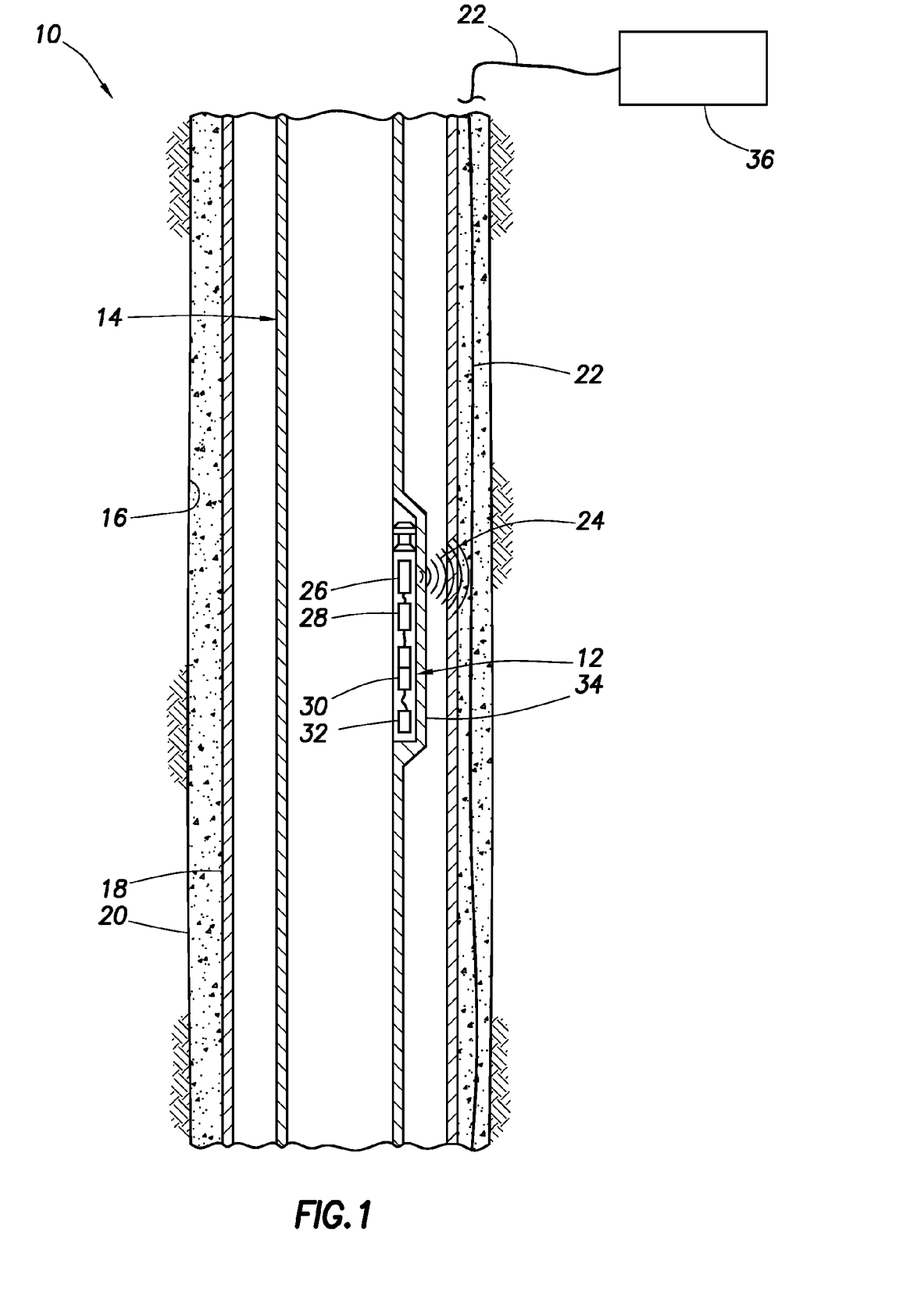
FIG. 1 is a representative partially cross-sectional view of a well telemetry system and associated method which can embody principles of this disclosure.

Representatively illustrated in FIG. 1 is a telemetry system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a well tool 12 is connected in a tubular string 14. The well tool 12 is received in a side pocket mandrel 34 of the tubular string 14.

The tubular string 14 is deployed in a wellbore 16 lined with a casing or other tubular string 18 and cement 20. In other examples, the wellbore 16 could be uncased or open hole.

An optical waveguide 22 (such as, an optical fiber, an optical ribbon, etc.) is positioned in the cement 20 external to the tubular string 18. In other examples, the optical waveguide 22 could be positioned internal to the tubular string 18, in a wall of the tubular string 18, etc.

The optical waveguide 22 serves as an acoustic receiver for receiving acoustic signals 24 transmitted from an acoustic transmitter 26 of the well tool 12. In addition to the transmitter 26, the well tool 12 includes electronic circuitry 28 (e.g., for modulating information on the acoustic signals 24), batteries 30 and at least one sensor 32.

The sensor 32 detects or measures one or more downhole parameters, such as, pressure, temperature, fluid type, water cut, etc. The scope of this disclosure is not limited to use of any particular type of sensor in the well tool 12.

The acoustic signals 24 cause vibrations, including variations in strain, in the optical fiber 22. An optical interrogator 36 connected to the optical waveguide 22 detects variations in light as transmitted through the optical waveguide due to the vibrations, and preferably demodulates the acoustic signal 24.

In a DAS system, the interrogator 36 may launch pulses of light into the optical waveguide 22 and detect backscattering of light (e.g., coherent Rayleigh backscattering) through the optical waveguide. In an interferometric or fiber Bragg grating systems, the interrogator 36 may detect variations in reflected amplitude and or phase of reflected light (e.g., from fiber Bragg gratings, etc.) through the optical waveguide 22, in order to detect the acoustic waves 24. Alternatively, if the fiber is in the form of a loop that travels from the surface, into the well and back to the surface, i.e., if both ends of the fiber are accessible at the surface, changes in amplitude and or phase of transmitted light may also be used to interrogate the system.

Note that the optical waveguide 22 is available to receive the acoustic signals 24 at any location in the wellbore 16 where the optical waveguide is present (or at least proximate). Thus, the well tool 12 can be positioned in other side pocket mandrels 34, other landing nipples, or other locations, and retain the ability to acoustically transmit the sensor 32 measurements to the optical waveguide 22.

Multiple well tools 12 may be positioned at different locations in the well. Each well tool 12 can include an acoustic transmitter 26 and at least one sensor 32. The optical waveguide 22 (and/or fiber Bragg gratings, Fabry-Perot interferometers, etc.) can serve as acoustic receiver(s) to receive the acoustic signals 24 transmitted from each of the well tools 12.

Figure 2:
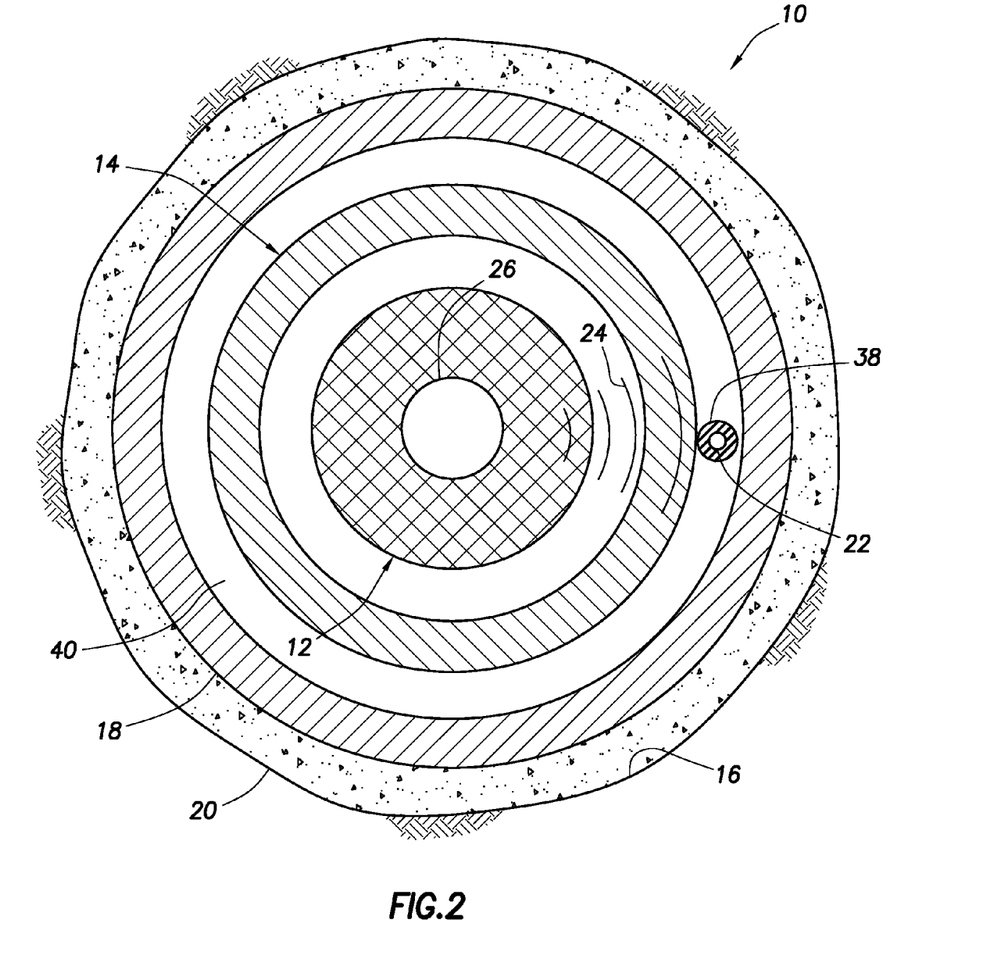
FIG. 2 is a representative cross-sectional view of another example of the system and method.

Referring additionally now to FIG. 2, another configuration of the system 10 is representatively illustrated in a lateral cross-sectional view. In this view, it may be seen that the optical waveguide 22 is included as part of a cable 38 in an annulus 40 formed radially between the tubular strings 14, 18. In some examples, the cable 38 could be attached to an exterior of the tubular string 14.

The well tool 12 is positioned in an interior of the tubular string 14. For example, the well tool 12 could be conveyed by wireline, slickline, coiled tubing, etc., into the tubular string.

The transmitter 26 transmits the acoustic signals 24 through the tubular string 14 to the optical waveguide 22 in the cable 38. In other examples, the cable 38 could be inside the tubular string 14, or in a wall of the tubular string.

It may now be fully appreciated that the above disclosure provides significant advancements to the well telemetry art. In one example, "wireless" sensor data transmission is available at any point in a well having an optical waveguide positioned nearby. The optical waveguide may be installed in the well for this telemetry purpose, or an existing optical waveguide may be utilized for this purpose, for example, by connecting a suitable optical interrogator to the existing optical waveguide.

Note, also, that multiple tools 12 with multiple sensors 32 and multiple acoustic transmitters 26 may be positioned in multiple locations in the well and can transmit acoustic data simultaneously in independent channels to the modified or unmodified optical waveguide 22.

A system 10 for use with a subterranean well is described above. In one example, the system 10 can include at least one well tool 12 positioned in the well, the well tool 12 including an acoustic transmitter 26 and a sensor 32, the acoustic transmitter 26 transmits an acoustic signal 24 including information representative of a measurement by the sensor 32 to an optical waveguide 22 positioned in the well, the optical waveguide 22 comprising an acoustic receiver. In other examples, the acoustic receiver may comprise fiber Bragg gratings and/or Fabry-Perot interferometers.

If an optical waveguide is used, the acoustic signal 24 may cause vibrations in the optical waveguide 22.

An optical interrogator 36 connected to the optical waveguide 22 may detect backscattering of light in the optical waveguide 22. The backscattering of light can be indicative of vibrations distributed along the optical waveguide 22.

The well tool 12 may be connected in a tubular string 14. The optical waveguide 22 can be positioned external to the tubular string 14.

The optical waveguide 22 may be positioned between tubular strings 14, 18. The optical waveguide 22 may be positioned in cement 20 external to a tubular string 18.

The at least one well tool may comprise multiple well tools, and the acoustic transmitters of the well tools 12 may transmit the acoustic signals 24 including information representative of measurements by the corresponding sensors 32 to the acoustic receiver.

Also described above is an acoustic telemetry method for use with a subterranean well. In one example, the method can comprise: positioning a well tool 12 in the well, the well tool 12 including an acoustic transmitter 26 and a sensor 32; and an optical waveguide 22 in the well receiving an acoustic signal 24 transmitted by the transmitter 26, the acoustic signal 24 including information representative of a measurement by the sensor 32.

Another system 10 for use with a subterranean well can comprise: a well tool 12 positioned in the well, the well tool 12 including an acoustic transmitter 26 and a sensor 32; and an optical waveguide 22 positioned in the well, the optical waveguide 22 receives an acoustic signal 24 transmitted by the transmitter 26, and the acoustic signal 24 including information representative of a measurement by the sensor 32.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A system for use with a subterranean well, the system comprising:

multiple well tools installed at longitudinally spaced apart locations along the well, each of the multiple well tools are encompassed in a side-pocket mandrel disposed in the well, each of the multiple well tools including a sensor to measure one or more downhole parameters and an acoustic transmitter which wirelessly transmits an acoustic signal including information representative of a measurement of the one or more downhole parameters by the sensor, and wherein the multiple well tools are configured to change a data source, a data rate, a modulation technique, or a transmitting frequency on command from a surface controller;

an optical waveguide positioned in the well, wherein the optical waveguide is present at each of the locations, the optical waveguide sensing the respective acoustic signal from the respective acoustic transmitter at the respective location for each of the multiple well tools; and an optical interrogator positioned at a surface of the earth and connected to the optical waveguide, the optical interrogator thereby receiving the respective information representative of the respective measurement by the respective sensor for each of the multiple well tools.

2. The system of claim 1, wherein the respective acoustic signal causes vibrations in the optical waveguide.

3. The system of claim 1, wherein the optical interrogator detects backscattering of light in the optical waveguide.

4. The system of claim 3, wherein the backscattering of light is indicative of vibrations distributed along the optical waveguide.

5. The system of claim 1, wherein the optical waveguide comprises a fiber Bragg grating.

6. The system of claim 1, wherein the optical interrogator comprises a Fabry-Perot interferometer.

7. The system of claim 1, wherein the multiple well tools are installed in a tubular string.

8. The system of claim 7, wherein the optical waveguide is positioned external to the tubular string.

9. The system of claim 1, wherein the optical waveguide is positioned between tubular strings.

10. The system of claim 1, wherein the optical waveguide is positioned in cement external to a tubular string.

11. The system of claim 1, wherein the optical waveguide comprises a distributed acoustic sensor.

12. An acoustic telemetry method for use with a subterranean well, the method comprising:

installing multiple well tools installed at longitudinally spaced apart locations along the well, each of the multiple well tools are encompassed in a side-pocket mandrel disposed in the well, each of the multiple well tools including a sensor to measure downhole parameters and an acoustic transmitter;

transmitting an acoustic signal from each of the multiple well tools via the respective acoustic transmitter, the respective acoustic signal including information representative of a measurement by the respective sensor, and wherein the multiple well tools are configured to change a data source, a data rate, a modulation technique, or a transmitting frequency on command from a surface controller;

positioning an optical waveguide in the well laterally adjacent each of the location, the optical waveguide sensing the respective acoustic signal from the respective acoustic transmitter at the respective location for each of the multiple well tools; and connecting the optical interrogator to the optical waveguide, the optical interrogator thereby receiving the respective information representative of the respective measurement of downhole parameters by the respective sensor for each of the multiple well tools.

13. The method of claim 12, further comprising the respective acoustic signal causing vibrations in the optical waveguide.

14. The method of claim 12, further comprising the optical interrogator detecting backscattering of light in the optical waveguide.

15. The method of claim 14, wherein the backscattering of light is indicative of vibrations distributed along the optical waveguide.

16. The method of claim 12, wherein the optical interrogator comprises a fiber Bragg grating.

17. The method of claim 12, wherein the optical interrogator comprises a Fabry-Perot interferometer.

18. The method of claim 12, wherein the multiple well tools are installed in a tubular string.

19. The method of claim 18, wherein the optical waveguide is positioned external to the tubular string.

20. The method of claim 12, wherein the optical waveguide is positioned between tubular strings.

21. The method of claim 12, wherein the optical waveguide is positioned in cement external to a tubular string.

22. The method of claim 12, wherein the optical waveguide comprises a distributed acoustic sensor.

23. The method of claim 12, wherein each of the multiple well tools is received in a separate pocket mandrel of the tubular string.

\* \* \* \* \*